US010882508B2

(12) United States Patent
Ohn

(10) Patent No.: US 10,882,508 B2
(45) Date of Patent: Jan. 5, 2021

(54) MOTOR CONTROL APPARATUS AND METHOD FOR DAMPING ENGINE VIBRATION

(71) Applicants: Hyundai Motor Company, Seoul (KR); Kia Motors Corporation, Seoul (KR)

(72) Inventor: Hyung Seuk Ohn, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 91 days.

(21) Appl. No.: 16/419,848

(22) Filed: May 22, 2019

(65) Prior Publication Data

US 2020/0164852 A1    May 28, 2020

(30) Foreign Application Priority Data

Nov. 23, 2018    (KR) .................... 10-2018-0146723

(51) Int. Cl.
*B60W 10/08* (2006.01)
*B60L 15/20* (2006.01)
*B60W 30/20* (2006.01)

(52) U.S. Cl.
CPC ............ *B60W 10/08* (2013.01); *B60L 15/20* (2013.01); *B60W 30/20* (2013.01); *B60W 2030/206* (2013.01)

(58) Field of Classification Search
CPC ....... B60W 10/08; B60W 30/20; B60L 15/20; B60L 50/16; B60L 3/0023
See application file for complete search history.

(56) References Cited

U.S. PATENT DOCUMENTS

| 4,440,129 | A  | * | 4/1984 | Iwata | F02P 5/152 123/406.37 |
| 7,633,257 | B2 |   | 12/2009 | Sakamoto et al. | |
| 2013/0325289 | A1 | * | 12/2013 | Ikeda | F02D 41/10 701/101 |
| 2014/0053805 | A1 | * | 2/2014 | Brennan | F02P 5/1512 123/350 |

(Continued)

OTHER PUBLICATIONS

Ochiai, S. and Ohnuki, Y., "Description of the Hybrid Technology Mounted to Production Model," SAE Technical Paper 2001-01-3418, 2001, https://doi.org/10.4271/2001-01-3418.

(Continued)

*Primary Examiner* — George C Jin
(74) *Attorney, Agent, or Firm* — Mintz Levin Cohn Ferris Glovsky and Popeo, P.C.; Peter F. Corless

(57) ABSTRACT

A motor control apparatus and method for damping engine vibration are provided. The apparatus includes a data collection device that collects engine information and motor information and a processor that determines a magnitude of engine torque vibration using the engine information and the motor information. A weighting value is determined by determining a position of a piston in a cylinder of an engine, ignition timing, an engine angular acceleration, and an engine velocity. A motor anti-phase torque is calculated by reflecting the determined weighting value in the magnitude of the engine torque vibration and a motor is operated based on the motor anti-phase torque to cancel out the engine torque vibration.

20 Claims, 10 Drawing Sheets

(56) References Cited

U.S. PATENT DOCUMENTS

2015/0120122 A1* 4/2015 Sakakibara ........... B60W 20/15
701/22
2017/0241369 A1* 8/2017 Jammoussi ......... F02D 41/0002

OTHER PUBLICATIONS

Ito, Yoshiaki, Shuji Tomura, and Kazunari Moriya. "Vibration-reducing motor control for hybrid vehicles." R&D Review of Toyota CRDL 40.2 (2005): 37-43.

Liu, D., Rodrigues, L., Brace, C., Akehurst, S. et al., "A Study on Dynamic Torque Cancellation in a Range Extender Unit," SAE Technical Paper 2016-01-1231, 2016, https://doi.org/10.4271/2016-01-1231.

Karvountzis-Kontakiotis, A., Ntziachristos, L., Samaras, Z., Dimaratos, A. et al., "Experimental Investigation of Cyclic Variability on Combustion and Emissions of a High-Speed SI Engine," SAE Technical Paper 2015-01-0742, 2015, https://doi.org/10.4271/2015-01-0742.

Heywood J.B.: Internal Combustion Engine Fundamentals, McGraw-Hill, ISBN 0-07-028637- X, 1988.

Matekunas F.: Modes and Measures of Cyclic Combustion Variability, SAE Paper 830337, 1983.

http://www.greencarcongress.com/2014/04/2014 0421-szybist.html.

* cited by examiner

MOTOR CONTROL APPARATUS AND METHOD FOR DAMPING ENGINE VIBRATION

CROSS-REFERENCE TO RELATED APPLICATION

This application is claims the benefit of priority to Korean Patent Application No. 10-2018-0146723 e on Nov. 23, 2018, the entire contents of which are incorporated herein by reference.

TECHNICAL FIELD

The present disclosure relates to a motor control apparatus and method for damping engine vibration, and more particularly, to a motor control apparatus and method for damping engine vibration by controlling a motor by predicting a motor anti-phase torque for cancelling out the engine vibration, in consideration of an engine velocity, an engine torque, ignition timing, and a damping factor of a damper.

BACKGROUND

Generally, examples of engine vibration include vibration generated in the main body of an engine during combustion, vibration generated by inertial forces during reciprocating and rotary motions of a piston, a connecting rod, and a crankshaft, vibration generated by operation of valve apparatuses, and the like. In the related art, to reduce engine vibration, a motor is controlled by determining motor anti-phase torque control time with respect to the top dead center (TDC) and determining the amplitude and period of a motor anti-phase torque using an engine torque and an engine velocity.

The engine vibration reduction technology through the motor control improves engine vibration reduction performance, but causes an increase in switching loss (electrical loss) in an inverter for generating a motor anti-phase torque that is the same as engine vibration. Furthermone, in the related art, it is difficult to pedict an engine torque variation (e.g., the magnitude of engine vibration) under a transient condition when an engine velocity transitions.

SUMMARY

The present disclosure provides a motor control apparatus and method for damping engine vibration by controlling a motor by predicting a motor anti-phase torque for cancelling out the engine vibration, in consideration of an engine velocity, an engine torque, ignition timing, and a damping factor of a damper.

Another aspect of the present disclosure provides a motor control apparatus and method for damping engine vibration by controlling a motor by assigning a weighting value to a motor anti-phase torque step, based on ignition timing, an engine velocity, and an engine angular acceleration. The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a motor control apparatus for damping engine vibration may include a data collection device configured to collect engine information and motor information and a processor configured to determine a magnitude of engine torque vibration using the engine information and the motor information, determine a weighting value by identifying a position of a piston in a cylinder of an engine, ignition timing, an engine angular acceleration, and an engine velocity, calculate a motor anti-phase torque by reflecting the determined weighting value in the magnitude of the engine torque vibration, and operate a motor based on the motor anti-phase torque to cancel out the engine torque vibration.

The engine information may include an engine torque included in a command output from a top-level controller, a top dead center (TDC) position detected by a TDC sensor, and an ignition command included in a command that an engine controller transmits to an ignition coil. The motor information may include a motor position angle measured by a motor position sensor. The processor may be configured to determine the position of the piston, the engine angular acceleration, and the engine velocity, based on the TDC position and the motor position angle. The processor may also be configured to reset the TDC position with respect to the motor position angle and determine a period of torque generated by each cylinder of the engine.

Additionally, the processor may be configured to determine the ignition timing by identifying whether the position of the piston at the time of receiving the ignition command is before or after the TDC position, and determine a first weighting value based on the determined ignition timing. The processor may be configured to determine a motor torque control pattern and a second weighting value based on an increase or decrease in the engine angular acceleration. Further, the processor may be configured to determine the motor torque control pattern to be a charge patter when the engine angular acceleration increases and determine the motor torque control pattern to be a discharge pattern when the engine angular acceleration decreases.

The processor may be configured to determine a third weighting value in consideration of the engine angular acceleration and the engine velocity. The third weighting value may be determined based on whether the engine velocity is within a range between a lower velocity limit and an upper velocity limit. The processor may then be configured to calculate the motor anti-phase torque in further consideration of a damping factor of a damper.

According to another aspect of the present disclosure, a motor control method for damping engine vibration may include collecting engine information and motor information, determining a position of a piston, an engine angular acceleration, an engine velocity, and a magnitude of engine torque vibration using the engine information and the motor information, determining ignition timing, based on the engine information and the position of the piston, determining a weighting value, based on the ignition timing, the engine angular acceleration, and the engine velocity, calculating a motor anti-phase torque by reflecting the weighting value in the magnitude of the engine torque vibration, and operating a motor based on the motor ani-phase torque to cancel out the engine torque vibration.

The engine information may include an engine torque included in a command output from a top-level controller, a top dead center (TDC) position detected by a TDC sensor, and an ignition command included in a command that an engine controller transmits to an ignition coil. The motor information may include a motor position angle measured by a motor position sensor. The determination of the position of the piston, the engine angular acceleration, the engine velocity, and the magnitude of the engine torque vibration may include calculating the position of the piston, the engine angular acceleration, and the engine velocity, based on the TDC position and the motor position angle.

Additionally, the determination of the ignition timing may include determining whether the position of the piston at the time of receiving the ignition command is before or after the TDC position. The determination of the weighting value may include determining a first weighting value based on the ignition timing, determining a second weighting value based on an increase or decrease in the engine angular acceleration, and determining a third weighting value, based on the engine angular acceleration and the engine velocity.

The determination of the second weighting value may include determining a motor torque control pattern based on the increase or decrease in the engine angular acceleration. Additionally, the determination of the third weighting value may include determining the third weighting value, based on whether the engine velocity is within a range between a lower velocity limit and an upper velocity limit. The calculating of the motor anti-phase torque may include calculating the motor anti-phase torque in further consideration of a damping factor of a damper.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
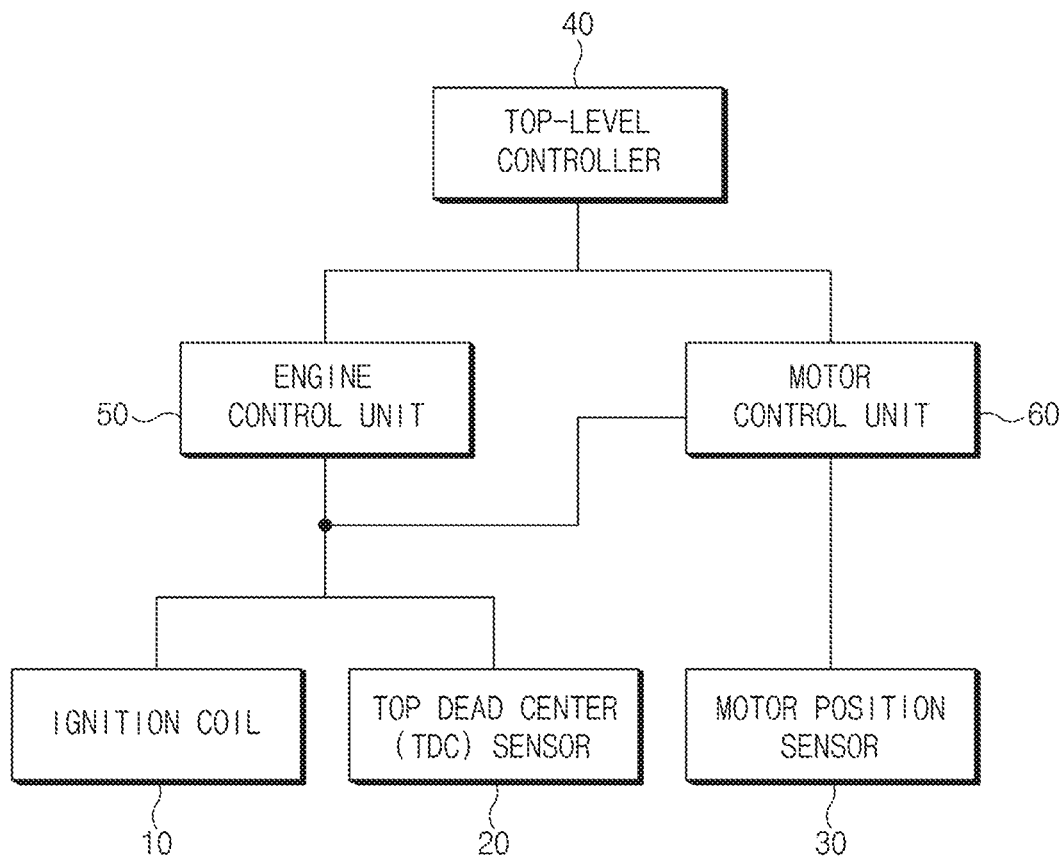
FIG. 1 is a block diagram illustrating an engine vibration reduction system according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, exemplary embodiments of the present disclosure will be described in detail with reference to the accompanying drawings. It should be understood that even if shown in different drawings, identical components are provided with identical reference numerals in the drawings. Furthermore, in describing the exemplary embodiments of the present disclosure, detailed descriptions related to well-known functions or configurations will be omitted when they may make subject matters of the present disclosure unnecessarily obscure.

Terms, such as "first", "second", "A", "B", "(a)", "(b)", and the like, may be used herein to describe components of the present disclosure. Such terms are only used to distinguish one component from another component, and the substance, sequence, order, or number of these components is not limited by these terms. Unless otherwise defined, all terms used herein, including technical and scientific terms, have the same meaning as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

The present disclosure relates to a technology for predicting the magnitude of an engine torque variation (the magnitude of engine vibration) by application of a feed-forward control technology and operating a motor to generate a motor anti-phase torque for cancelling out the predicted magnitude of the engine torque variation. The engine vibration reduction technology of the present disclosure is applicable to a hybrid drive system including an engine and at least one motor and is applicable irrespective of a coupling structure (e.g., a direct-coupling structure, a structure having a gear ratio, or the like) between the engine and the motor.

Figure 2:
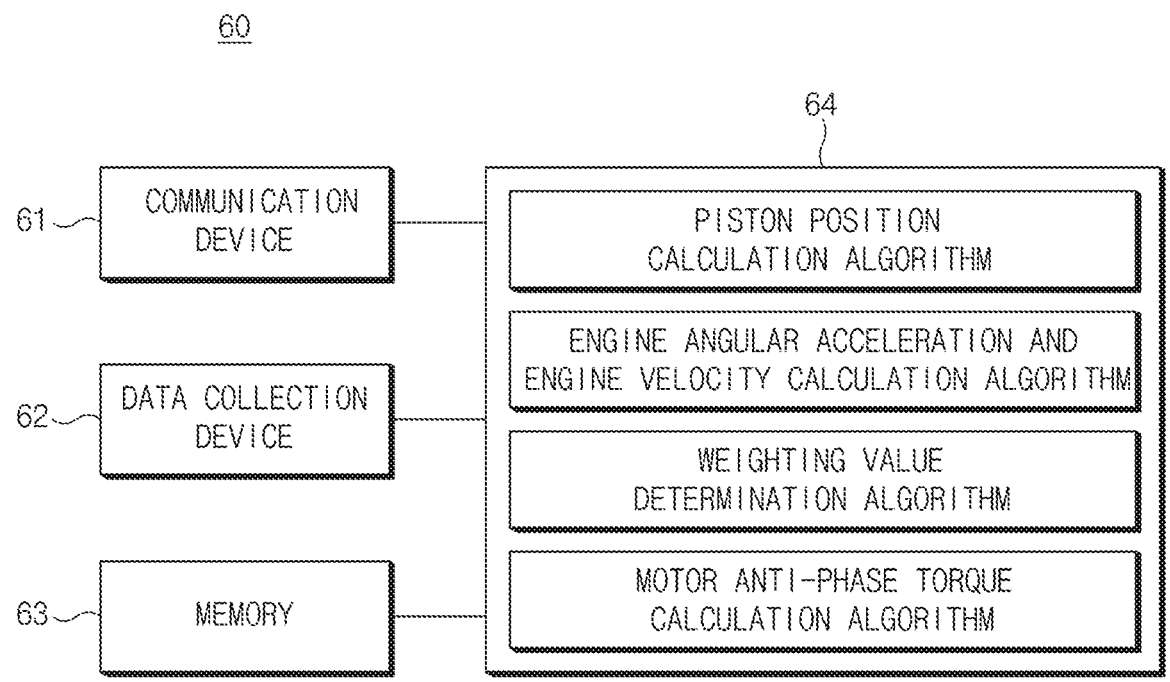
FIG. 2 is a block diagram illustrating a motor controller illustrated in FIG. 1 according to an exemplary embodiment of the present disclosure.
Figure 3:
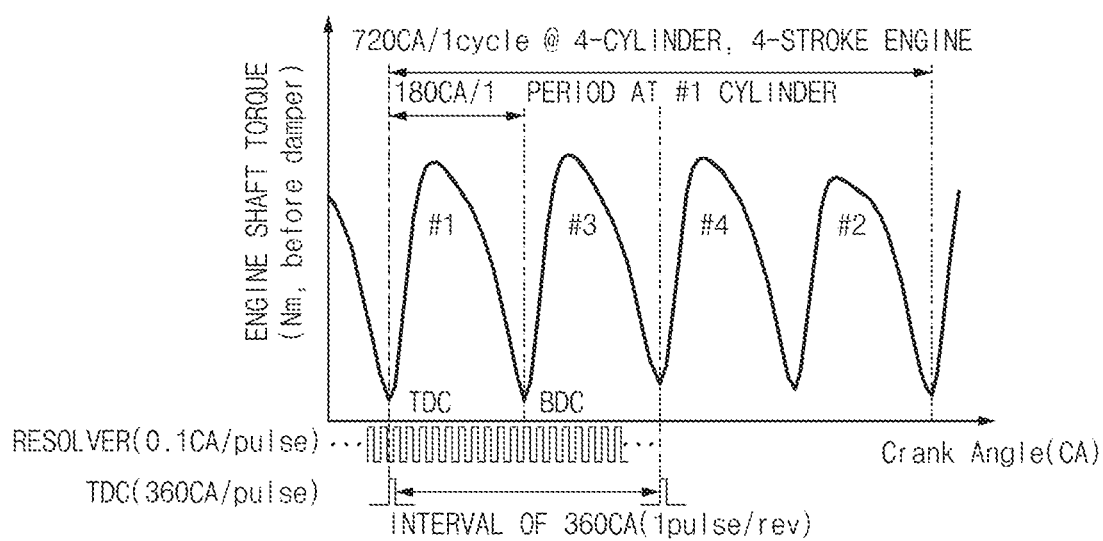
FIG. 3 is a view illustrating an engine velocity calculation process according to an exemplary embodiment of the present disclosure.
Figure 4:
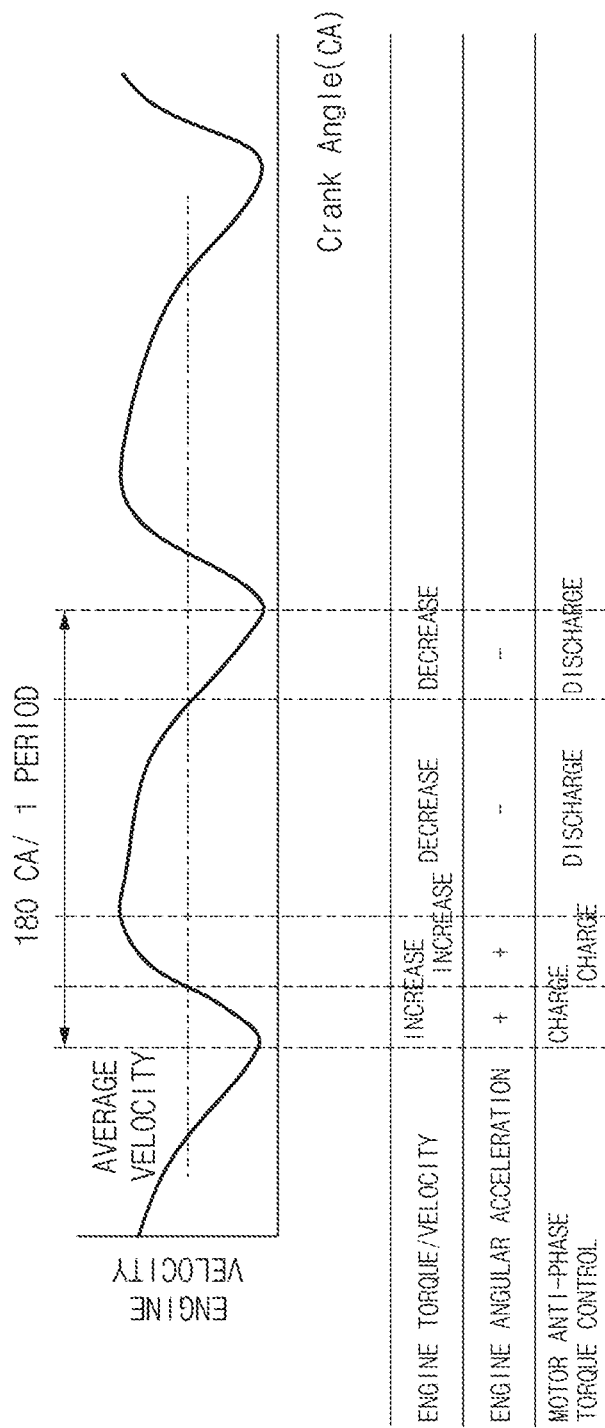
FIG. 4 is a view illustrating a method for determining a motor anti-phase torque control pattern according to an exemplary embodiment of the present disclosure.
Figure 5:
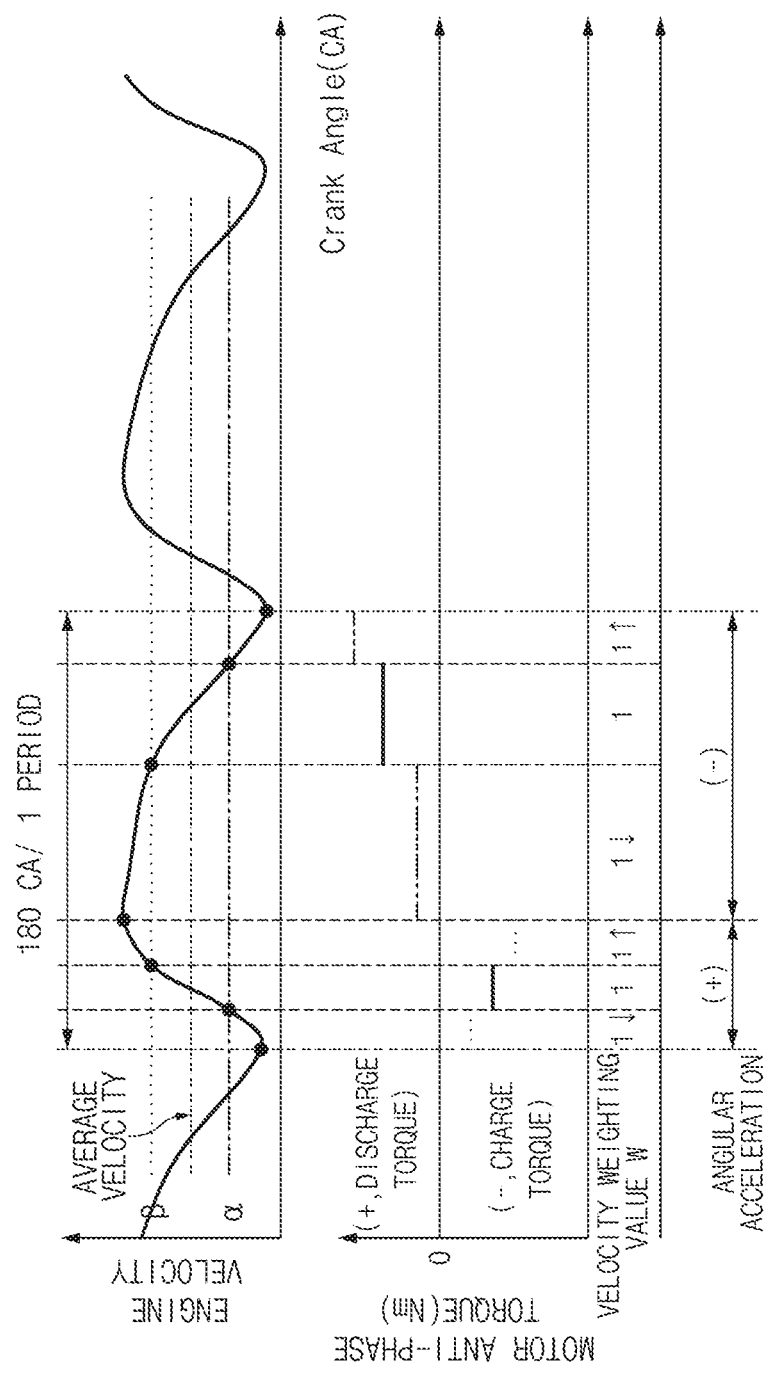
FIG. 5 is a view illustrating a weighting-value determination method based on an engine angular acceleration and an engine velocity according to an exemplary embodiment of the present disclosure.

FIG. 1 is a block diagram illustrating an engine vibration reduction system according to an exemplary embodiment of the present disclosure. FIG. 2 is a block diagram illustrating a motor controller illustrated in FIG. 1. FIG. 3 is a view illustrating an engine velocity calculation process related to the present disclosure. FIG. 4 is a view illustrating a method for determining a motor anti-phase torque control pattern related to the present disclosure. FIG. 5 is a view illustrating a weighting-value determination method based on an engine angular acceleration and an engine velocity, which is related to the present disclosure.

Referring to FIG. 1, the engine vibration reduction system may include an ignition coil 10, a top dead center (TDC) sensor 20, a motor position sensor 30, a top-level controller 40, an engine control unit (ECU) 50, and a motor control unit (MCU) 60 that are coupled via an in-vehicle network (IVN). The IVN may be implemented with a controller area network (CAN), a media oriented systems transport (MOST) network, a local interconnect network (LIN), and/or an x-by-wire (Flexray).

The ignition coil 10 is an induction coil that generates an electric spark in a spark plug of an ignition system. The ignition coil 10 transforms low-voltage direct current (DC) power from a vehicle battery to an ignition pulse with a high induced voltage and supplies the ignition pulse to the spark plug. The TDC sensor 20 is a sensor configured to detect a TDC position, that is, the position of a piston when the piston reaches the uppermost position in a cylinder of an engine. The TDC position may be used to determine the position of the piston in the cylinder of the engine and time to start motor anti-phase torque control.

The TDC sensor 20 may be embedded in a distributor that routes high voltage from the ignition coil 10 to spark plugs in a firing order. The TDC sensor 20 may be configured to transmit the detected TDC position to the ECU 50 and the MCU 60. The motor position sensor 30 may be installed toward a motor and may be configured to detect the position of a motor rotor (e.g., a motor position angle). Additionally, the motor position sensor 30 may be configured to transmit the detected motor position angle (e.g., rotation angle) to the MCU 60. The motor position sensor 30 may be implemented with a resolver. Since the resolver with a resolution of more than about 0.1 deg/pulse is more excellent in resolution than an engine crankshaft sensor (e.g., 60-2 tooth/rev=6 deg/pulse), the position of the piston may be determined more accurately using data measured by the resolver, which makes it possible to more precisely control motor torque.

The top-level controller 40 may be configured to monitor a driving state of a vehicle and transmit operating commands to electronic controllers, such as the ECU 50, the MCU 60, a vehicle dynamic controller, and a battery controller, according to the driving state to control operations of the vehicle. The top-level controller 40 may be implemented with a hybrid control unit (HCU). Further, the top-level controller 40 may be configured to sense or detect a driver operation of an accelerator pedal using an accelerator pedal sensor. The top-level controller 40 may be configured to calculate a required torque necessary for driving the vehicle based on the driver operation of the accelerator pedal and transmit the required torque to the ECU 50 and the MCU 60.

In other words, the top-level controller 40 may be configured to calculate an engine torque and a motor torque required based on the driver operation of the accelerator pedal and transmit the calculated engine torque and the calculated motor torque to the ECU 50 and the MCU 60 as commands (instructions). At this time, the top-level controller 40 may be configured to transmit the engine torque to the MCU 50 as well as the ECU 50.

Particularly, the ECU 50 is an electronic controller configured to operate the engine (e.g., ignition timing, an amount of fuel to be injected, engine knocking control, and the like). The ECU 50 may be configured to determine ignition timing, based on input information such as a rotating velocity of the engine, a TDC position, a load (e.g., intake manifold pressure), a throttle valve position, an engine temperature, an intake air temperature, and a storage battery voltage that are input from sensors. Additionally, the ECU 50 may be configured to transmit a command signal (an IGN signal) for instructing ignition (IGN), that is, an ignition command, to the ignition coil 10 at corresponding ignition time based on the determined ignition timing. At this time, the ECU 50 may be configured to transmit the ignition command to the MCU 60 as well as the ignition coil 10. The ignition command may be implemented with an edge trigger, and the edge trigger may be classified into a rising edge trigger and a falling edge trigger.

The MCU 60 is an electronic controller configured to operate the motor coupled with an engine shaft. In particular, the MCU 60 may be configured to perform motor anti-phase torque control for reducing engine vibration (e.g., an engine torque variation), based on engine information and motor information. Referring to FIG. 2, the MCU 60 may include a communication device 61, a data collection device 62, a memory 63, and a processor 64.

The communication device 61 may be configured to perform communication with the components 10 to 50, which constitute the engine vibration reduction system, via the IVN. The communication device 61 may be configured to exchange data with the TDC sensor 20, the motor position sensor 30, the top-level controller 40, and the ECU 50. The data collection device 62 may be configured to collect or obtain engine information and motor information. In addition, the data collection device 62 may be configured to collect information via the communication device 61, or directly collect information from the TDC sensor 20, the motor position sensor 30, the top-level controller 40, and the ECU 50. The engine information may include an engine command torque (an engine torque), a motor command torque (a motor torque), a TDC position, and an ignition command. The motor information may include a motor position angle.

In other words, the data collection device 62 may be configured to receive the engine torque and the motor torque included in a command transmitted from the top-level controller 40 and receive the ignition command from the ECU 50. The data collection device 62 may be configured to receive the TDC position information (TDC information) from the TDC sensor 20 and receive the motor position angle from the motor position sensor 30. The data collection device 62 may be configured to temporarily store the collected input information in the memory 63. In other words, the data collection device 62 may be configured to store the engine torque, the motor torque, the TDC position, the ignition command, and the motor position angle in the memory 63.

The memory 63 may be configured to store a program for executing an overall operation of the processor 64. The memory 63 may be configured to temporarily store input data and/or output data of the processor 64. The memory 63 may be implemented with at least one storage medium (recording medium) among storage mediums such a flash memory, a hard disk, a secure digital (SD) card, an random access memory (RAM), a static random access memory (SRAM), a read only memory (ROM), a programmable read only memory (PROM), an electrically erasable and programmable ROM (EEPROM), an erasable and programmable ROM (EPROM), a register, a detachable disk, and a web storage.

Additionally, the memory 63 may be configured to store a piston position calculation algorithm, an engine angular acceleration and engine velocity calculation algorithm, a weighting value determination algorithm, and a motor anti-phase torque calculation algorithm. The memory 63 may also be configured to store a damping factor of a damper, a torque phase lag by the damper, and a lookup table. The damping factor of the damper and the torque phase lag by the damper are unique values determined by the mass of a disc constituting the damper and a spring design value (e.g., a damper specification). The lookup table may include engine torque variations (e.g., the magnitudes of engine vibrations) based on engine velocities and engine torques that have been previously estimated for the engine mounted in the vehicle.

The processor 64 may be configured to execute an overall operation of the MCU 60. The processor 64 may include at least one of an application specific integrated circuit (ASIC), a digital signal processor (DSP), programmable logic devices (PLDs), field programmable gate arrays (FPGAs), a central processing unit (CPU), microcontrollers, and microprocessors. Particularly, the processor 64 may be configured to determine the position of the piston in the cylinder of the engine using the TDC position and the motor position angle. In other words, the processor 64 may be configured to calculate the absolute position of the piston using the TDC position and the motor position angle. At this time, the processor 64 may be configured to reset the TDC position with respect to the motor position angle and determine a period of torque generated in each cylinder of the engine. For example, in the case of a 4-cylinder, 4-stroke engine, the processor 64 may be configured to determine a torque generation period for each cylinder to be about 180 deg (=180 CA).

Further, the processor 64 may be configured to calculate an engine angular acceleration and an engine velocity using the TDC position and the motor position angle. The processor 64 may be configured to calculate the engine angular acceleration in real time and the engine velocity (e.g., an average engine velocity) every period (e.g., 180 deg) using the engine angular acceleration calculation algorithm and the engine velocity calculation algorithm. The engine angular acceleration and the engine velocity are used as variables of weighting values for determining the magnitude of a motor anti-phase torque and feedback control.

In particular, the engine angular acceleration is a motor velocity variation over time, that is, an engine velocity variation over time and is expressed as an angular acceleration increase (+, an engine output increase) or an angular acceleration decrease (−, an engine output decrease). The engine velocity is an average engine velocity of engine cylinders for one cycle. For example, for a 4-cylinder, 4-stroke engine with 180 CA/1 period for each cylinder as illustrated in FIG. 3, the processor 64 may be configured to calculate an average engine velocity for each cylinder for 1 period (180 CA) and derive a total of 4 average engine velocities for each cylinder for 1 cycle (720 CA). The processor 64 may be configured to average the four average engine velocities for each cylinder to obtain an average engine velocity for 1 cycle and define the average engine velocity for 1 cycle as an engine velocity. The processor 64 may be configured to perform the average engine velocity calculation process for two or more cycles, calculate the mean of average engine velocities, and define the mean value as an engine velocity.

Additionally, the processor 64 may be configured to determine ignition timing, based on the ignition command and the position of the piston. The processor 64 may be configured to determine whether the position of the piston at the time of receiving the ignition command is before the TDC position. The processor 64 may be configured to determine whether the ignition timing is before or after top dead center, based on the position of the piston at the time of receiving the ignition command. When the position of the piston at the time of receiving the ignition command is before the TDC position, the processor 64 may be configured to determine that the ignition timing is before top dead center. Meanwhile, when the position of the piston at the time of receiving the ignition command is after the TDC position, the processor 64 may be configured to determine that the ignition timing is after top dead center.

The processor 64 may be configured to determine and assign a first weighting value based on the ignition timing (ignition time). When the ignition timing is before top dead center, the processor 64 may be configured to determine the first weighting value to be "1". Meanwhile, when the ignition timing is after top dead center, the processor 64 may be configured to determine the first weighting value to be a value greater than 0 and less than 1. At this time, the processor 64 may be configured to determine the first weighting value to be a value between 0 and 1, based on the position of the piston.

The first weighting value may be assigned based on whether the ignition timing (ignition time) is before or after top dead center since an explosive force by engine combustion starts to be transmitted to the engine shaft at the ignition time when the engine piston passes through the top dead center, but as the ignition time is retarded at the same engine velocity, the maximum engine torque gradually decreases and torque holding time increases. The processor 64 may be configured to determine whether the engine torque (e.g., the engine velocity) increases or decreases, based on the engine angular acceleration. The engine shaft torque (e.g., the engine torque) sharply increases after TDC time, and at this time, the engine velocity also increases. The engine torque and the engine velocity have a tendency to decrease after a predetermined period of time elapses.

The processor 64 may be configured to determine a motor torque control pattern, based on the engine angular acceleration. The motor torque control pattern refers to a motor control direction for motor anti-phase torque control. The motor torque control pattern may be classified into a charge pattern (e.g., a charge direction) and a discharge pattern (e.g., a discharge direction). When the engine torque and the engine velocity increase, the processor 64 may be configured to determine the motor torque control pattern to be the charge pattern (−), and when the engine torque and the engine velocity decrease, the processor 64 may be configured to determine the motor torque control pattern to be the discharge pattern (+).

For example, as illustrated in FIG. 4, when the engine torque increases, the engine angular acceleration has a positive value, and therefore, the processor 64 may be configured to determine the motor torque control pattern to be the charge pattern (+). Meanwhile, when the engine torque decreases, the engine angular acceleration has a negative value, and therefore the processor 64 may be configured to determine the motor torque control pattern to be the discharge pattern (+). Furthermore, the processor 64 may be configured to generate a motor anti-phase torque pattern for 1 period (180 CA) using the determined motor torque control pattern.

The processor 64 may be configured to determine and assign a second weighting value, based on the engine angular acceleration. When the engine angular acceleration has a positive value, the processor 64 may be configured to determine the second weighting value to be "−1", and when the engine angular acceleration has a negative value, the processor 64 may be configured to determine the second weighting value to be "1". In addition, the processor 64 may be configured to determine a third weighting value, based on the engine angular acceleration and the engine velocity. At this time, the processor 64 may be configured to subdivide the third weighting value by applying a threshold value to the engine velocity. The processor 64 may be configured to determine the third weighting value, based on whether the engine velocity is within a range between a lower velocity limit $\alpha$ and an upper velocity limit $\beta$.

Particularly, the lower velocity limit $\alpha$ and the upper velocity limit $\beta$ may be determined by the engine velocity. For example, when the average engine velocity (e.g., the engine velocity) is about 1500 rpm and the lower velocity limit $\alpha$ and the upper velocity limit $\beta$ are about 10% and about 20% of the engine velocity, the lower velocity limit $\alpha$ may be about 1350 rpm (=1500×(1−0.1)), and the upper velocity limit $\beta$ may be about 1800 rpm (=1500×(1+0.2)). The processor 64 may be configured to determine the third weighting value W according to the engine angular acceleration and the engine velocity, as listed in Table 1 below.

TABLE 1

| Classification | $V < \alpha$ | $\alpha \leq V < \beta$ | $\beta \leq V$ | Motor Anti-phase Torque |
|---|---|---|---|---|
| Engine Angular Acceleration > 0 (Engine Torque/ Velocity Increase) | $0 < W \leq 1$ | $W = 1$ | $1 \leq W$ | Charge |
| Engine Angular Acceleration < 0 (Engine Torque/ Velocity Decrease) | $1 \leq W$ | $W = 1$ | $0 < W \leq 1$ | Discharge |

Here, V is the current engine velocity.

For example, referring to FIG. 5, when the engine angular acceleration has a positive (+) value, the processor 64 may be configured to determine the third weighting value to be a value greater than 0 and less than or equal to 1 when the current engine velocity is less than the lower velocity limit $\alpha$, determine the third weighting value to be 1 when the current engine velocity is within the range between the lower velocity limit $\alpha$ and the upper velocity limit $\beta$, and determine the third weighting value to be a value greater than or equal to 1 when the current engine velocity is greater than or equal to the upper velocity limit $\beta$. When the engine angular acceleration has a negative (−) value, the processor 64 may be configured to determine the third weighting value to be a value greater than or equal to 1 when the current engine velocity is less than the lower velocity limit $\alpha$, determine the third weighting value to be 1 when the current engine velocity is within the range between the lower velocity limit $\alpha$ and the upper velocity limit $\beta$, and determine the third weighting value to be a value greater than 0 and less than or equal to 1 when the current engine velocity is greater than or equal to the upper velocity limit $\beta$.

Further, the processor 64 may be configured to reflect the first to third weighting values in the magnitude of engine torque vibration to calculate a motor anti-phase torque. In other words, the processor 64 may be configured to reflect the first to third weighting values in the magnitude of an engine torque variation to determine the magnitude (amplitude) of the motor anti-phase torque for cancelling out the magnitude of the engine torque variation. The processor 64 may be configured to calculate the motor anti-phase torque in further consideration of the damping factor of the damper. The damper mechanically dampens the engine shaft torque (vibration) and may include a disc having a specific mass and a spring. When the engine torque variation (the engine vibration) is reduced by the damper, a phase lag of torque occurs, and therefore the maximum engine torque position is retarded. Accordingly, motor anti-phase torque control time also has to be adjusted based on the retardation by the top dead center and the damper.

Figure 6:
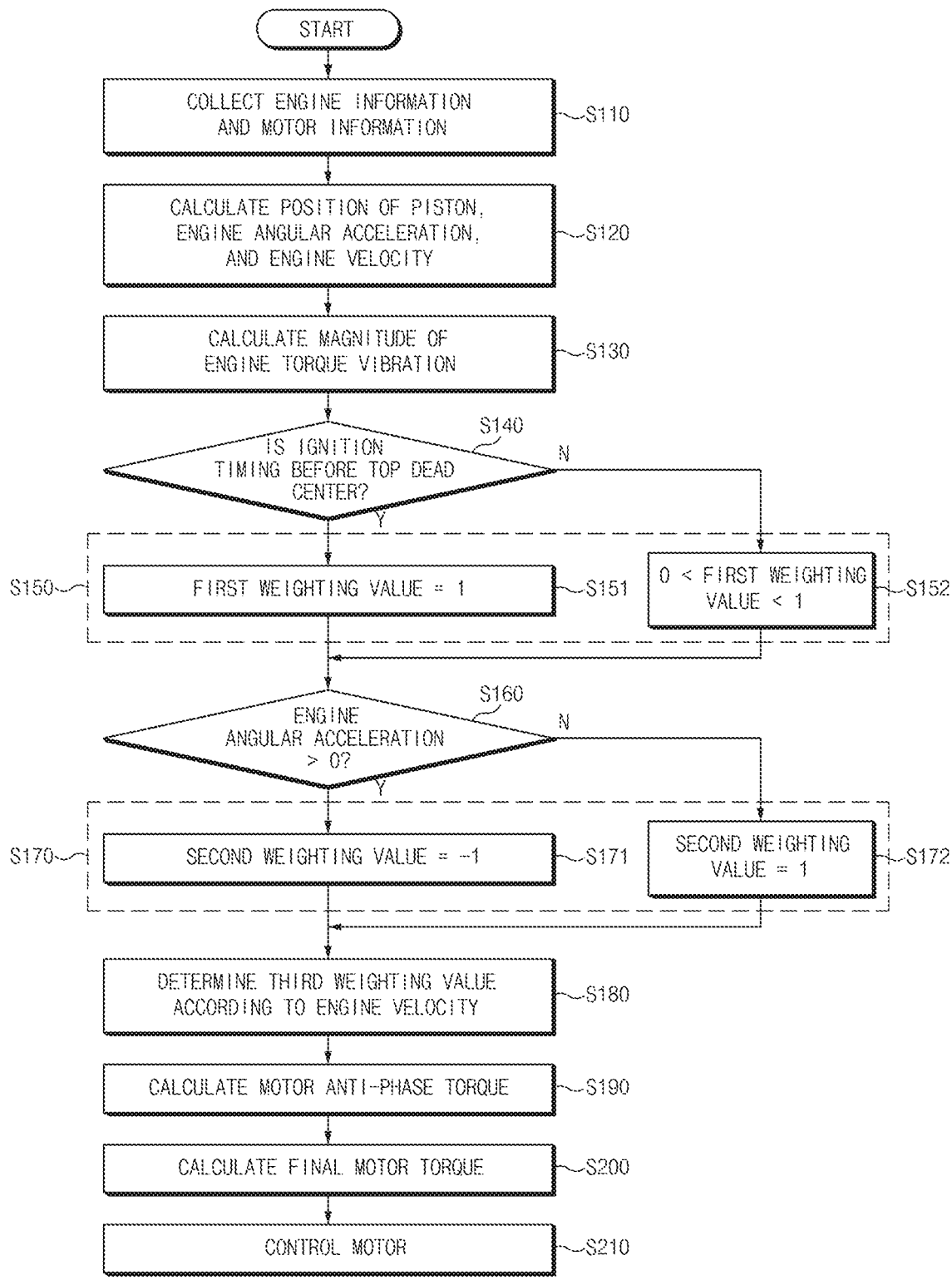
FIG. 6 is a flowchart illustrating a method for reducing engine vibration according to an exemplary embodiment of the present disclosure.
Figure 7A:
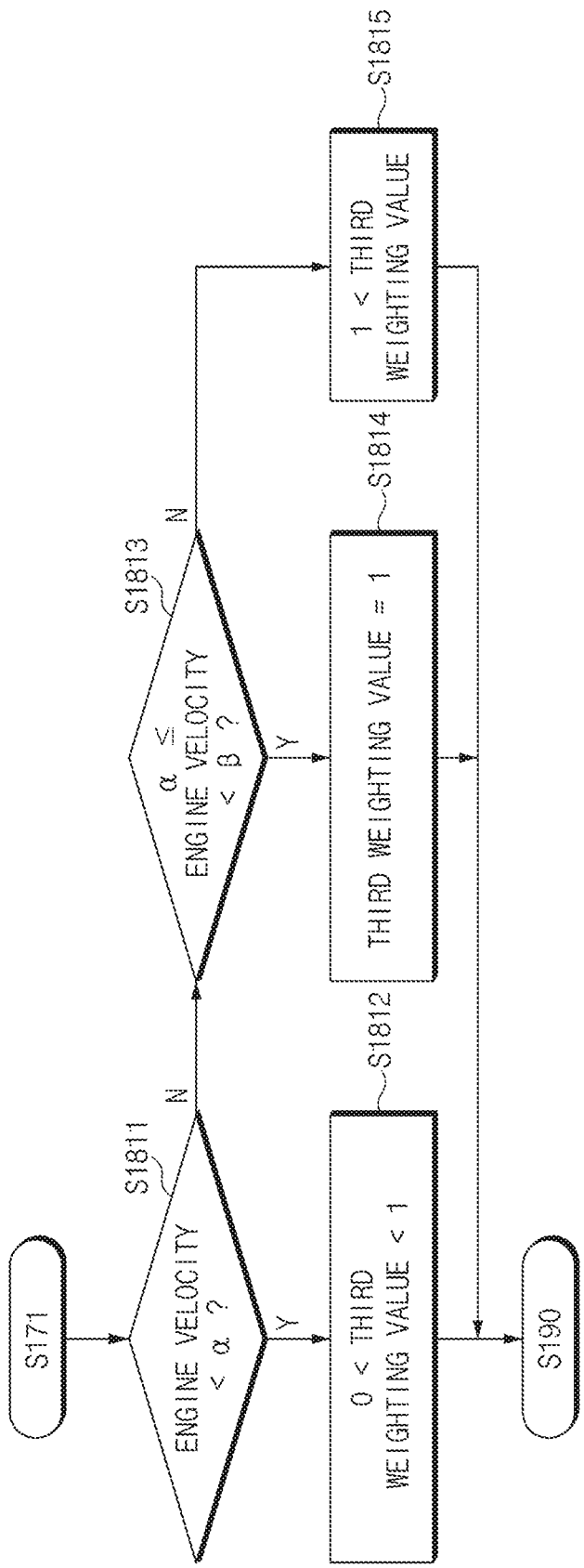
FIGS. 7A and 7B are flowcharts illustrating a third-weighting-value determination step illustrated in FIG. 6 according to an exemplary embodiment of the present disclosure.
Figure 7B:
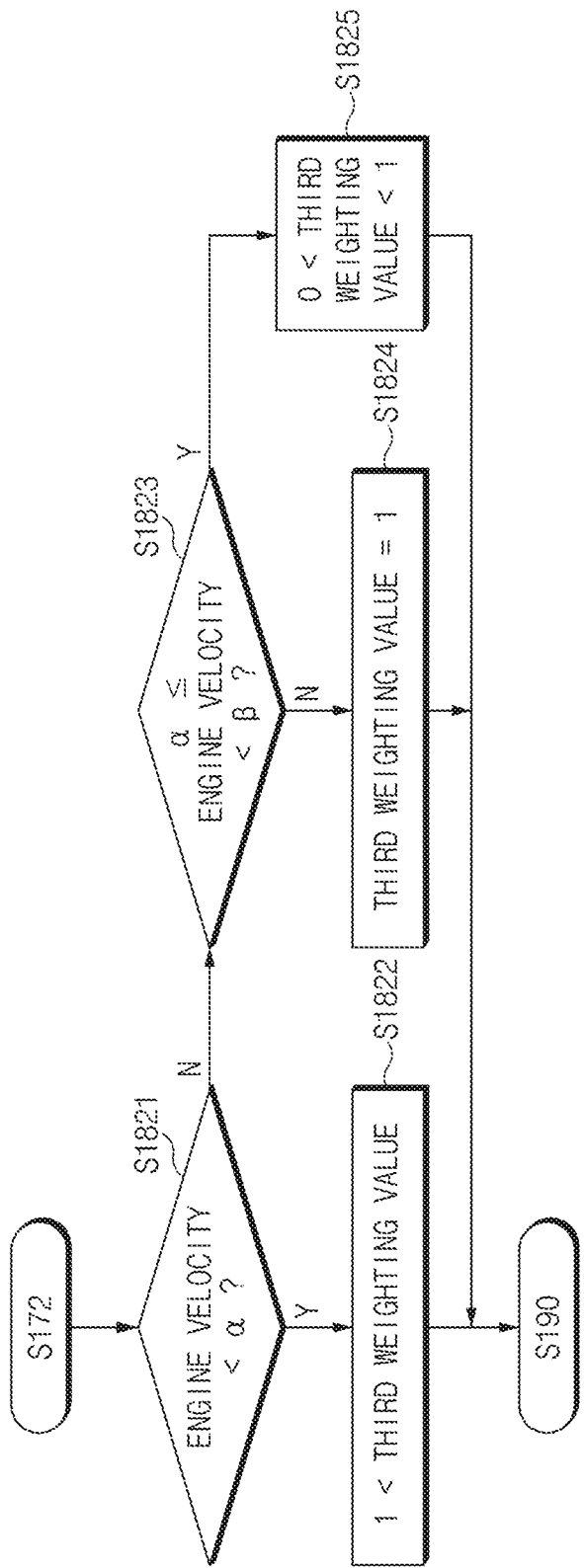

FIG. 6 is a flowchart illustrating a method for reducing engine vibration according to an exemplary embodiment of the present disclosure, and FIGS. 7A and 7B are flowcharts illustrating a third-weighting-value determination step illustrated in FIG. 6.

Particularly, the MCU 60 may be configured to receive engine information and motor information (Step S110). The engine information may include an engine command torque, a motor command torque, an ignition command, and a TDC position. The motor information may include a motor position angle. The MCU 60 may be configured to collect the engine command torque (engine torque) and the motor command torque (motor torque) from the top-level controller 40 and receive the ignition command from the ECU 50. The MCU 60 may be configured to receive the TDC position from the TDC sensor 20 and receive the motor position angle from the motor position sensor 30.

Additionally, the MCU 60 may be configured to calculate a position of a piston in a cylinder of an engine, an engine angular acceleration, and an engine velocity using the engine information and the motor information (Step S120). The processor 60 may be configured to calculate the position of the piston, the engine angular acceleration, and the engine velocity using the TDC position and the motor position angle. The MCU 60 may be configured to determine the magnitude of an engine output variation, based on the engine velocity and the engine command torque (the engine torque) (Step S130). At this time, the MCU 60 may be configured to determine the magnitude of the engine torque variation (e.g., the magnitude of engine torque vibration) with reference to a lookup table stored in the memory 63.

The MCU 60 may be configured to determine whether ignition timing is before top dead center, based on the ignition command and the TDC position (Step S140). In particular, the MCU 60 may be configured to determine whether the position of the piston at the time of receiving the ignition command is before top dead center. The MCU 60 may also be configured to determine a first weighting value, based on whether the ignition timing is before or after top dead center (Step S150). When the ignition timing is before top dead center, the MCU 60 may be configured to determine the first weighting value to be 1 (Step S151). Meanwhile, when the ignition timing is after top dead center, the MCU 60 may be configured to determine the first weighting value to be greater than 0 and less than 1 (Step S152).

Further, the MCU 60 may be configured to determine whether the engine angular acceleration has a positive value (Step S160). At this time, the MCU 60 may be configured to determine whether the engine torque and the engine velocity increase, based on the engine angular acceleration. When the engine angular acceleration has a positive value, the MCU 60 may be configured to determine that the engine torque and the engine velocity increase, and when the engine angular acceleration has a negative value, the MCU 60 may be configured to determine that the engine torque and the engine velocity decrease. Furthermore, the MCU 60 may be configured to determine a motor torque control pattern (e.g., a charge pattern or a discharge pattern), based on the engine angular acceleration.

A second weighting value may be determined by the MCU 60 based on the engine angular acceleration (Step S170). The MCU 60 may be configured to determine the second weighting value to be −1 when the engine angular acceleration exceeds 0 (Step S171). Meanwhile, the MCU 60 may be configured to determine the second weighting value to be 1 when the engine angular acceleration does not exceed 0 (e.g., is less than 0) (Step S172). In other words, the MCU 60 may be configured to assign −1 to the second weighting value when the engine angular acceleration has a positive value, and assign 1 to the second weighting value when the engine angular acceleration has a negative value. The MCU 60 may be configured to determine a third weighting value based on the engine angular acceleration and the engine velocity (Step S180). At this time, the MCU 60 may be configured to subdivide the third weighting value by applying a threshold value to the engine velocity.

First, a method for determining the third weighting value based on the engine velocity in the case where the engine angular acceleration exceeds 0 (increases) will be described. When the engine velocity is less than the lower velocity limit α, the MCU 60 may be configured to determine the third weighting value to be a value between 0 and 1 (Steps S1811 and S1812). When the engine velocity is greater than or equal to the lower velocity limit α and less than the upper velocity limit β, the MCU 60 may be configured to determine the third weighting value to be 1 (Steps S1813 and S1814). When the engine velocity exceeds the upper velocity limit β, the MCU 60 may be configured to determine the third weighting value to be a value exceeding 1 (Steps S1813 and S1815).

Next, a method for determining the third weighting value based on the engine velocity in the case where the engine angular acceleration is less than or equal to 0 (decreases) will be described. When the engine velocity is less than the lower velocity limit α, the MCU 60 may be configured to determine the third weighting value to be a value exceeding 1 (Steps S1821 and S1822). When the engine velocity is greater than or equal to the lower velocity limit α and less than the upper velocity limit β, the MCU 60 may be configured to determine the third weighting value to be 1 (Steps S1823 and S1824). When the engine velocity exceeds the upper velocity limit β, the MCU 60 may be configured to determine the third weighting value to be a value between 0 and 1 (Steps S1823 and S1825).

The MCU 60 may then be configured to reflect the first weighting value, the second weighting value, and the third weighting value in the magnitude of the engine torque variation (e.g., the magnitude of the engine output variation) to calculate a motor anti-phase torque (Step S190). At this time, the MCU 60 may be configured to calculate the motor anti-phase torque (the magnitude thereof) in further consideration of a damping factor of a damper. The MCU 60 may be configured to calculate the final motor torque based on the calculated motor anti-phase torque (Step S200) and operate a motor based on the calculated final motor torque (Step S210). The MCU 60 may be configured to add the motor command torque transmitted from the top-level controller 40 to the motor anti-phase torque (=the magnitude of the engine torque variation×the first weighting value×the damping factor of the damper×the second weighting value×the third weighting value), determined based on the position of the piston, to calculate the final motor torque (=the motor command torque+the motor anti-phase torque). To determine time to start applying a motor anti-phase torque pattern, the MCU 60 may be configured to generate a motor anti-phase torque pattern for each engine piston explosion period using the TDC position and the position of the piston. The MCU 60 may be configured to integrate the motor anti-phase torque pattern into the existing motor command torque to generate the final motor torque.

Figure 8:
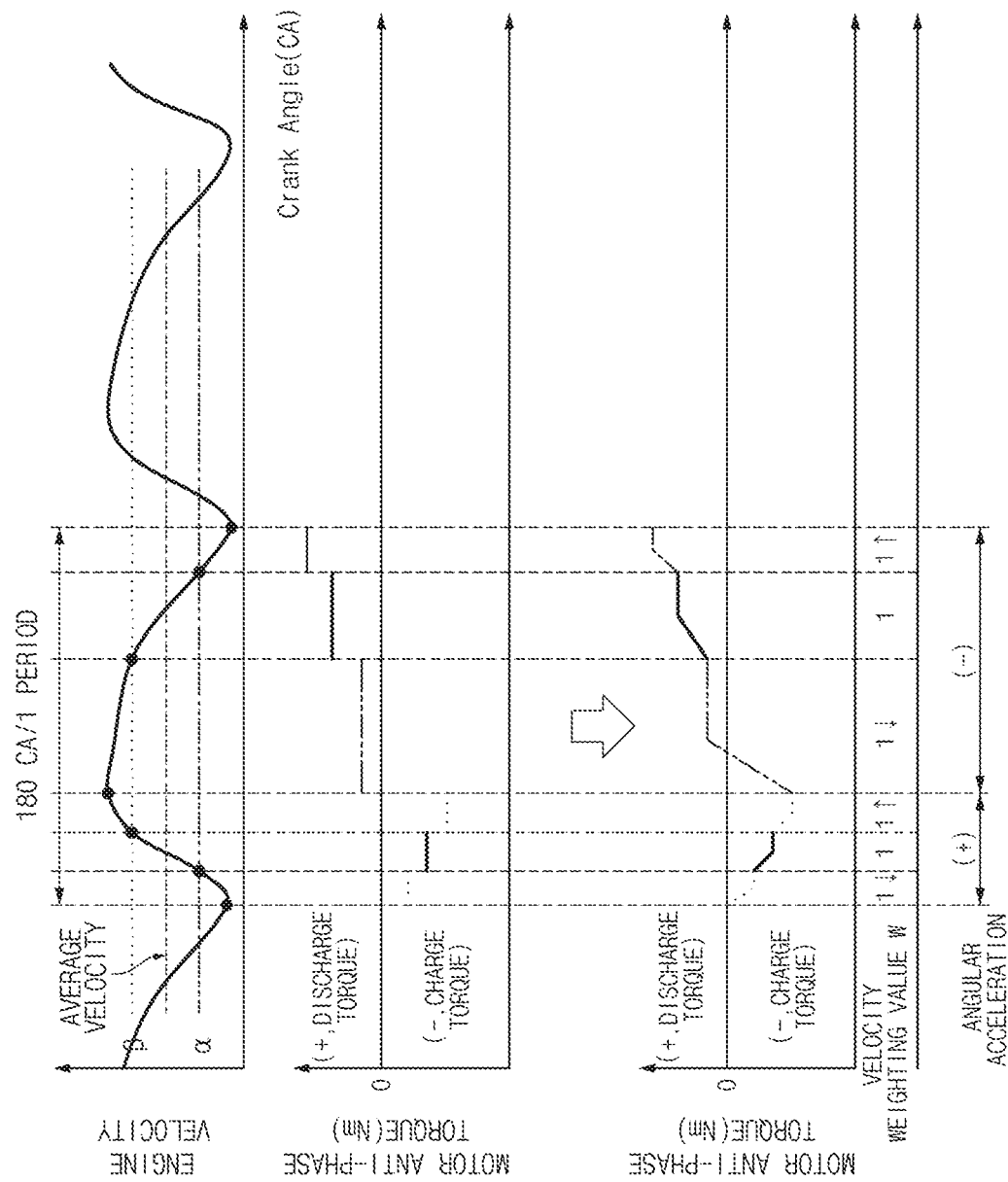
FIGS. 8 and 9 are views illustrating a method for varying the size and time of a motor anti-phase torque step according to an exemplary embodiment of the present disclosure.
Figure 9:
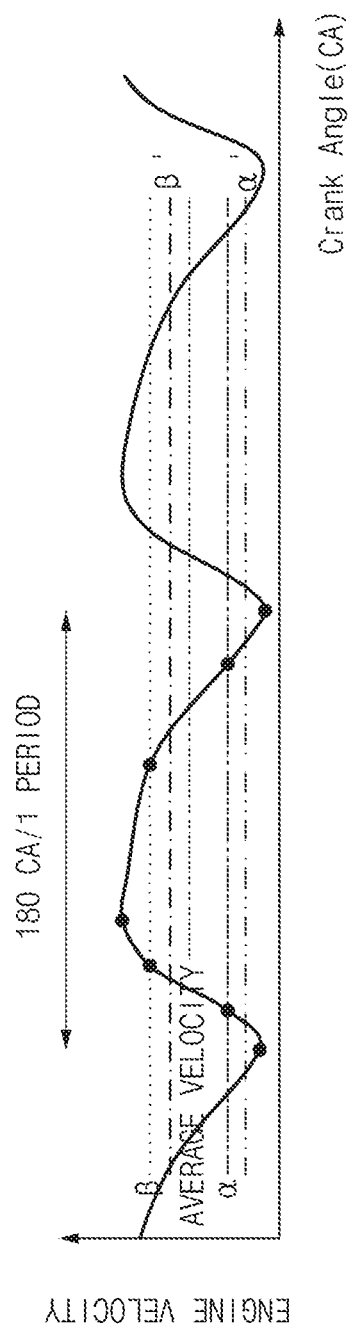

FIGS. 8 and 9 are views illustrating a method for varying the size and time of a motor anti-phase torque step according to the present disclosure. As illustrated in FIG. 8, when a motor anti-phase torque changes at a specific rate of change (slope) when a motor anti-phase torque step is changed, the motor anti-phase torque step has to be adjusted by additionally subdividing the motor anti-phase torque step. Accordingly, the motor anti-phase torque step may be increased by variably setting and subdividing the range between the lower velocity limit α and the upper velocity limit β that are set with respect to the average engine velocity. As illustrated in FIG. 9, the motor anti-phase torque step may be additionally subdivided by additionally setting the range between the lower velocity limit α and the upper velocity limit β to the range between a lower velocity limit α' and an upper velocity limit β'.

For example, when an engine torque variation is substantial (e.g., with a decrease in engine velocity or an increase in engine torque), a necessity to adjust the magnitude of the motor anti-phase torque by subdividing it increases. In contrast, when the engine torque variation is minimal, the necessity to adjust the magnitude of the motor anti-phase torque by subdividing it decreases. Accordingly, the range between the lower velocity limit α and the upper velocity limit β and the subdivision thereof have to be variably set based on the engine velocity and the engine torque.

According to the above-described exemplary embodiments, engine vibration control using a motor enables reduction or elimination of an engine damper, thereby reducing manufacturing cost of a vehicle, decreasing the overall weight of the vehicle to improve fuel efficiency, and ensuring space between the engine and the motor to provide an advantage in package. Furthermore, the present disclosure adjusts a motor torque in a stepwise manner to dampen engine vibration and optimize electrical loss, thereby simplifying a control operation.

In addition, the present disclosure changes a motor anti-phase torque for each cylinder in a stepwise manner to reduce engine vibration. Accordingly, it is unnecessary to increase the specification of an engine damper, and thus the present disclosure is applicable to a dedicated-exhaust gas recirculation (D-EGR) engine. According to the present disclosure, the motor may be operated by predicting the motor anti-phase torque, based on the engine velocity, the engine torque, the ignition timing, and the damping factor of the damper, whereby vibration generated in the engine may be reduced. In addition, the motor may be operated by assigning the weighting value to the motor anti-phase torque step, based on the ignition timing, the engine velocity, and the engine angular acceleration, whereby control accuracy may be improved.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims. Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed based on the accompanying claims, and all the technical ideas within the scope equivalent to the claims should be included in the scope of the present disclosure.

What is claimed is:

1. A motor control apparatus for damping engine vibration, comprising:
    a data collection device configured to collect engine information and motor information; and
    a processor configured to determine a magnitude of engine torque vibration using the engine information and the motor information, determine a weighting value by determining a position of a piston in a cylinder of an engine, ignition timing, an engine angular acceleration, and an engine velocity, calculate a motor anti-phase torque by reflecting the determined weighting value in the magnitude of the engine torque vibration, and operate a motor based on the motor anti-phase torque to cancel out the engine torque vibration.

2. The apparatus of claim 1, wherein the engine information includes an engine torque included in a command output from a top-level controller, a top dead center (TDC) position detected by a TDC sensor, and an ignition command included in a command that an engine controller transmits to an ignition coil.

3. The apparatus of claim 2, wherein the motor information includes a motor position angle measured by a motor position sensor.

4. The apparatus of claim 3, wherein the processor is configured to determine the position of the piston, the engine angular acceleration, and the engine velocity, based on the TDC position and the motor position angle.

5. The apparatus of claim 4, wherein the processor is configured to reset the TDC position with respect to the motor position angle and determine a period of torque generated by each cylinder of the engine.

6. The apparatus of claim 3, wherein the processor is configured to determine the ignition timing by identifying whether the position of the piston at the time of receiving the ignition command is before or after the TDC position, and determine a first weighting value based on the determined ignition timing.

7. The apparatus of claim 3, wherein the processor is configured to determine a motor torque control pattern and a second weighting value based on an increase or decrease in the engine angular acceleration.

8. The apparatus of claim 7, wherein the processor is configured to determine the motor torque control pattern to be a charge pattern when the engine angular acceleration increases, and determine the motor torque control pattern to be a discharge pattern when the engine angular acceleration decreases.

9. The apparatus of claim 3, wherein the processor is configured to determine a third weighting value based on the engine angular acceleration and the engine velocity.

10. The apparatus of claim 9, wherein the processor is configured to determine the third weighting value, based on whether the engine velocity is within a range between a lower velocity limit and an upper velocity limit.

11. The apparatus of claim 1, wherein the processor is configured to calculate the motor anti-phase torque in further consideration of a damping factor of a damper.

12. A motor control method for damping engine vibration, comprising:
    collecting, by a processor, engine information and motor information;
    determining, by the processor, a position of a piston, an engine angular acceleration, an engine velocity, and a magnitude of engine torque vibration using the engine information and the motor information;
    determining, by the processor, ignition timing, based on the engine information and the position of the piston;
    determining, by the processor, a weighting value, based on the ignition timing, the engine angular acceleration, and the engine velocity;
    calculating, by the processor, a motor anti-phase torque by reflecting the weighting value in the magnitude of the engine torque vibration; and
    operating, by the processor, a motor based on the motor anti-phase torque to cancel out the engine torque vibration.

13. The method of claim 12, wherein the engine information includes an engine torque included in a command output from a top-level controller, a top dead center (TDC) position detected by a TDC sensor, and an ignition command included in a command that an engine controller transmits to an ignition coil.

14. The method of claim 13, wherein the motor information includes a motor position angle measured by a motor position sensor.

15. The method of claim 14, wherein determining the position of the piston, the engine angular acceleration, the engine velocity, and the magnitude of the engine torque vibration includes:
    calculating, by the processor, the position of the piston, the engine angular acceleration, and the engine velocity, based on the TDC position and the motor position angle.

16. The method of claim 14, wherein determining the ignition timing includes:
    determining, by the processor, whether the position of the piston at the time of receiving the ignition command is before or after the TDC position.

17. The method of claim 14, wherein determining the weighting value includes:
    determining, by the processor, a first weighting value based on the ignition timing;
    determining, by the processor, a second weighting value based on an increase or decrease in the engine angular acceleration; and
    determining, by the processor, a third weighting value, based on the engine angular acceleration and the engine velocity.

18. The method of claim 17, wherein determining the second weighting value includes:
  determining, by the processor, a motor torque control pattern based on the increase or decrease in the engine angular acceleration.

19. The method of claim 17, wherein determining the third weighting value includes:
  determining, by the processor, the third weighting value, based on whether the engine velocity is within a range between a lower velocity limit and an upper velocity limit.

20. The method of claim 12, wherein calculating the motor anti-phase torque includes:
  calculating, by the processor, the motor anti-phase torque in further consideration of a damping factor of a damper.

* * * * *